W. G. BENNETT.
TANK GAGE.
APPLICATION FILED OCT. 19, 1917.
1,264,143.
Patented Apr. 30, 1918.
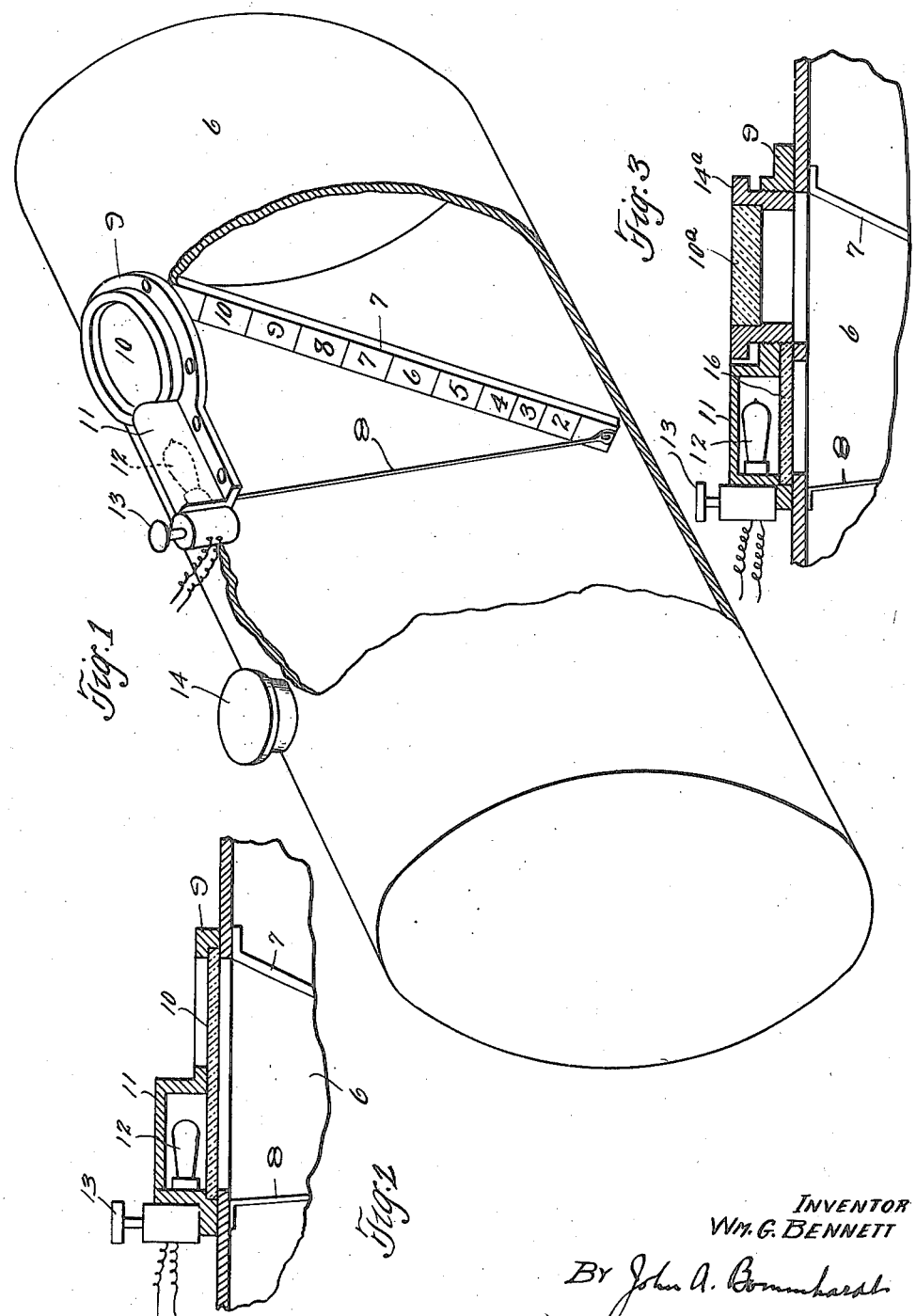
INVENTOR
WM. G. BENNETT
BY John A. Bomhardt
ATTY.

UNITED STATES PATENT OFFICE.

WILLIAM G. BENNETT, OF NORTH RIDGEVILLE, OHIO.

TANK-GAGE.

1,264,143.　　　　　Specification of Letters Patent.　　Patented Apr. 30, 1918.

Application filed October 19, 1917. Serial No. 197,391.

*To all whom it may concern:*

Be it known that I, WILLIAM G. BENNETT, a citizen of the United States, residing at North Ridgeville, in the county of Cuyahoga and State of Ohio, have invented certain new and useful Improvements in Tank-Gages, of which the following is a specification.

This invention relates to gages for tanks for fluids such as gasolene or the like, and has for its object to provide a gage located within the tank, with improved means for illuminating the same so that it can be read when desired. The device avoids the use of any moving parts which are more or less uncertain and apt to get out of order, providing a stationary gage which can be inspected as occasion demands.

In the accompanying drawings—

Figure 1 is a perspective view of the device applied to a tank.

Fig. 2 is a detail in section.

Fig. 3 is a section of a modification.

Referring specifically to the drawings, 6 indicates a tank within which is fixed a gage bar 7 extending at an inclination from the top of the tank downwardly, the lower end being supported by a brace 8. The bar is provided with gage marks related to the levels of different volumes in the tank. Near the upper end of the gage bar the tank is provided with an opening around which is fastened a frame 9, for a glass 10 through which the gage bar is visible, and the gage can be read by looking through this glass. The frame 9 also supports or is provided with a housing 11 containing an electric lamp 12 the light of which shines through the opening in the top of the tank, to illuminate the gage bar 7. The lamp is controlled by a push button or other switch 13 which opens or closes the circuit thereto, so that the lamp need be lighted only when the gage is to be read. The light from the lamp illuminates the gage bar so that it can be readily seen through the window 10, and the depth observed. A filler cap is shown at 14.

In the modification shown in Fig. 3, instead of having a separate filler cap, a cap 14$^a$ is provided which screws into the frame 9, and the glass 10$^a$ is set in this filler cap, a separate glass 16 being placed under the lamp casing 11. The manner of reading the gage is the same as I have above described.

I claim:—

1. A tank having a fixed gage bar extending downwardly therein and provided with gage marks along the same related to different levels in the tank, a window in the wall of the tank through which the gage bar may be seen, and means to illuminate said gage bar.

2. A tank containing an inclined gage bar and having an opening therein, a window in the top of the tank through which the gage bar may be seen, and a lamp mounted on the tank and shining through said opening, to illuminate the gage bar.

3. A tank having a fixed gage bar extending downwardly in the interior of the tank from the upper part thereof and provided with gage marks related to the depth of liquid in the tank, a window in the wall of the tank through which the gage bar may be seen, and a lamp shining into the tank and adapted to illuminate the gage bar.

4. A tank having therein a fixed gage bar provided along the same with gage marks related to different liquid levels in the tank, a window in the wall of the tank through which the liquid therein and the gage bar may be inspected, and means to illuminate the gage bar.

5. A tank provided with a fixed gage bar therein extending at an inclination downwardly from the top thereof and provided with marks along the same related to different liquid levels in the tank, a window in the top of the tank through which the liquid in the tank, and the bar, may be inspected, and a lamp mounted on the top of the tank and adapted to illuminate the interior of the tank and the gage bar.

In testimony whereof, I do affix my signature in presence of two witnesses.

WILLIAM G. BENNETT.

Witnesses:
　JOHN A. BOMMHARDT,
　G. W. ROSENBERG.